(12) United States Patent
Hirakawa et al.

(10) Patent No.: US 7,572,497 B2
(45) Date of Patent: Aug. 11, 2009

(54) HONEYCOMB STRUCTURE

(75) Inventors: Toshihiro Hirakawa, Kasugai (JP);
Yoshiyuki Kasai, Kasugai (JP)

(73) Assignee: NKG Insulators, Ltd., Nagoya (JP)

( * ) Notice: Subject to any disclaimer, the term of this patent is extended or adjusted under 35 U.S.C. 154(b) by 0 days.

(21) Appl. No.: 11/727,359

(22) Filed: Mar. 26, 2007

(65) Prior Publication Data

US 2007/0231538 A1 Oct. 4, 2007

(30) Foreign Application Priority Data

Mar. 29, 2006 (JP) ............................. 2006-091941
Feb. 14, 2007 (JP) ............................. 2007-033023

(51) Int. Cl.
*B32B 3/12* (2006.01)
*B01D 39/06* (2006.01)

(52) U.S. Cl. ....................... 428/116; 428/117; 428/119; 55/483; 55/523

(58) Field of Classification Search ................ 428/116, 428/117, 314.2, 316.6, 304.4; 422/177, 180, 422/211, 222; 55/523; 502/407, 414, 415
See application file for complete search history.

(56) References Cited

U.S. PATENT DOCUMENTS 6,159,431 A 12/2000 Inoue et al.

2004/0123573 A1* 7/2004 Ichikawa et al. .............. 55/523
2004/0137194 A1* 7/2004 Fukao et al. ................. 428/116
2005/0180898 A1* 8/2005 Yamada ...................... 422/180

FOREIGN PATENT DOCUMENTS

EP          1 413 344 A1   4/2004
JP          A 10-264125    10/1998

* cited by examiner

*Primary Examiner*—Timothy M Speer
*Assistant Examiner*—Gordon R Baldwin
(74) *Attorney, Agent, or Firm*—Oliff & Berridge, PLC

(57) ABSTRACT

There is disclosed a honeycomb structure which solves a problem of antinomy that it is difficult to satisfy both of a high temperature rise performance and a high thermal capacity at the same time and which is disposed at a previous stage of a filter for trapping particulate matters (PM) discharged from a diesel engine so that regeneration of the PM trapped by the filter can smoothly be completed and an exhaust gas can efficiently be purified. In a honeycomb structure in which a plurality of cells arranged in parallel with one another to communicate between two end surfaces of the honeycomb structure are formed by a plurality of partition walls, the plurality of partition walls are made of a ceramic, each cell is formed into a substantially square shape, an intersection between the partition walls is formed into an R-shape or a C-shape, a value (L/T) of a ratio of a diagonal distance L between the intersections to an average thickness T of the partition walls is set to 1.6 or more, and an open area ratio of the cells is set to 55% or more.

5 Claims, 1 Drawing Sheet

HONEYCOMB STRUCTURE

BACKGROUND OF THE INVENTION

1. Field of the Invention

The present invention relates to a honeycomb structure. The present invention more particularly relates to a honeycomb structure which solves a problem of antinomy that it is difficult to satisfy both of a high temperature rise performance and a high thermal capacity at the same time and which is disposed upstream a filter for trapping particulate matters (PM) discharged from a diesel engine so that regeneration of the PM trapped by the filter can smoothly be completed and an exhaust gas can efficiently be purified.

2. Description of the Related Art

With tightening of regulation of an exhaust gas discharged from a diesel engine, various methods have been proposed in which a diesel particulate filter (DPF) is used in trapping particulate matters (PM) included in the exhaust gas from the diesel engine. In general, a method is adopted in which the DPF is coated with a catalyst that oxidizes the PM, and a honeycomb structure coated with the same catalyst is mounted upstream the DPF. In this honeycomb structure, the PM generated by depositing NO included in the exhaust gas as $NO_2$ on the DPF are burnt. Alternatively, post injection is performed by controlling the engine. A non-burnt fuel is oxidized, an exhaust gas temperature is raised, and the PM deposited on the DPF are burnt and regenerated.

To smoothly burn and regenerate the PM deposited on the DPF, it is necessary to set a time when the catalyst with which the above honeycomb structure is coated reaches an activation temperature to be as long as possible. However, the diesel engine has a low exhaust temperature. Under a small load, the honeycomb structure does not reach the catalyst activation temperature. Even after an operation under a large load, during rapid transfer to the small load, the temperature of the honeycomb structure rapidly drops below the catalyst activation temperature in some case. There have been problems that a burning property of the PM is obstructed and that forced regeneration is not completed.

In view of the above problem, in general, countermeasures such as thinning of cell partition walls of the honeycomb structure and raising of porosity are performed to reduce a thermal capacity of the honeycomb structure and improve a temperature rise characteristic of a substrate. In consequence, the catalyst activation temperature is quickly reached.

When the thermal capacity of the substrate is reduced, the temperature rise characteristic of the substrate is improved, and the coated catalyst can quickly reach the catalyst activation temperature. Conversely, when the exhaust gas temperature drops, the temperature rapidly drops below the catalyst activation temperature. When the exhaust gas temperature drops, to inhibit the temperature drop of the substrate, the thermal capacity of the substrate is increased. In this case, the temperature rise characteristic deteriorates, and there is an antinomic relation between the thermal capacity and the temperature rise characteristic. That is, when the partition wall thickness and porosity of the substrate are simply changed to change the thermal capacity, it is difficult to lengthen a time when the catalyst with which the honeycomb structure is coated reaches the activation temperature.

SUMMARY OF THE INVENTION

The present invention has been developed in view of the above problem, and an object of the present invention is to provide a honeycomb structure which solves a problem of antinomy that it is difficult to satisfy both of a high temperature rise performance and a high thermal capacity at the same time and which is disposed at a previous stage of a filter for trapping particulate matters (PM) discharged from a diesel engine so that regeneration of the PM trapped by the filter can smoothly be completed and an exhaust gas can efficiently be purified.

To achieve the above object, according to the present invention, the following honeycomb structure is provided.

[1] A honeycomb structure comprising:
a plurality of partition walls, and
a plurality of cells arranged in parallel with one another to communicate between two end surfaces of the honeycomb structure being formed by the plurality of partition walls, wherein the plurality of partition walls are made of a ceramic; the cells have a substantially square shape; an intersection between the partition walls has a right-angled shape or a curved shape; a value of a ratio of a diagonal distance between the intersections to an average thickness of the partition walls (the diagonal distance between the intersections/the average thickness of the partition walls) is 1.6 or more; and an open area ratio of the cells is 55% or more.

[2] The honeycomb structure according to the above [1], wherein the partition walls are made of at least one ceramic selected from the group consisting of cordierite, alumina, mullite and lithium aluminosilicate (LAS).

[3] A honeycomb structure coated with a catalyst, constituted by coating the honeycomb structure according to the above [1] or [2] with the catalyst.

[4] A purification device comprising: a filter, and the honeycomb structure according to the above [1] or [2], or the honeycomb structure coated with the catalyst according to the above [3], upstream the filter.

According to the present invention, the honeycomb structure is provided which solves a problem of antinomy that it is difficult to satisfy both of a high temperature rise performance and a high thermal capacity at the same time and which is disposed at a previous stage of a filter for trapping particulate matters (PM) discharged from a diesel engine so that regeneration of the PM trapped by the filter can smoothly be completed and an exhaust gas can efficiently be purified.

DESCRIPTION OF THE PREFERRED EMBODIMENT

Figure 1:
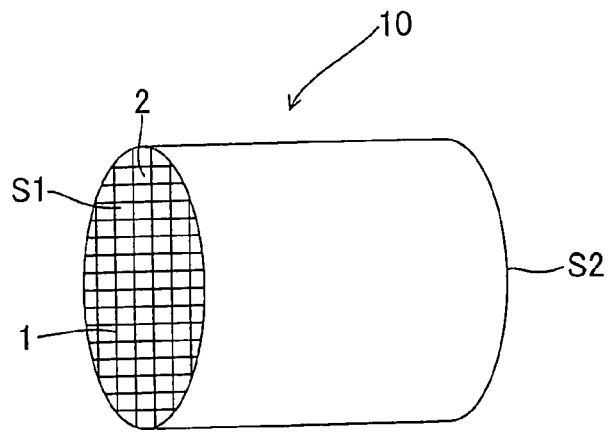
FIG. 1 is a perspective view showing one embodiment of a honeycomb structure according to the present invention.
Figure 2:
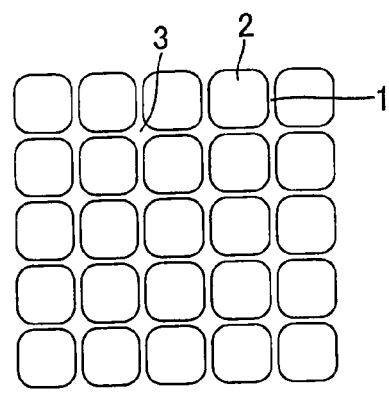
FIG. 2 is an explanatory view showing one end surface of the honeycomb structure shown in FIG. 1.
Figure 3:
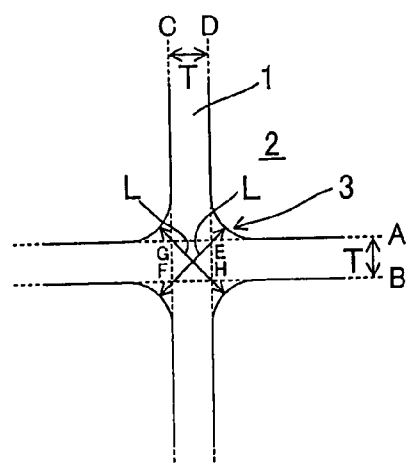
FIG. 3 is an explanatory view showing a definition of a diagonal distance between intersections according to the present embodiment.

The best mode for carrying out the present invention will hereinafter be described specifically with reference to the drawings. FIG. 1 is a perspective view showing one embodiment of a honeycomb structure according to the present invention; FIG. 2 is an explanatory view showing one end surface of the honeycomb structure shown in FIG. 1; and FIG. 3 is an explanatory view showing a definition of a diagonal distance between intersections according to the present embodiment. As shown in FIG. 1, a honeycomb structure of the present embodiment is a honeycomb structure 10 in which a plurality of cells 2 arranged in parallel with one another to communicate between two end surfaces S1 and S2 of the honeycomb structure are formed by a plurality of partition walls 1. The plurality of walls 1 are made of a ceramic described later. As shown in FIG. 2, the cells 2 have a substantially square shape. As shown in FIG. 2, an intersection 3 between the partition walls 1 has a right-angled shape (an R-shape) or a curved shape (a C-shape). As shown in FIG. 3, a value (L/T) of a ratio of a diagonal distance L between the intersections 3 to an average thickness T of the partition walls 1 is 1.6 or more, preferably 1.8 or more. An open area ratio of the cells 2 is 55% or more, preferably 60% or more.

Here, the value (L/T) of the ratio of the diagonal distance L between the intersections 3 to the average thickness T of the partition walls 1 will be described. As shown in FIG. 3, when parallel lines AB and CD are drawn along the partition walls 1, it is assumed that an average distance between the parallel lines is "the average thickness T of the partition walls 1". Assuming that intersections between the parallel lines AB and CD are E, F, G and H, respectively, an average length between the intersections 3, measured along lines passing through the intersections E and F and the intersections G and H, is defined as "the diagonal distance L between the intersections 3".

Moreover, the open area ratio of the cells 2 is a ratio of opening portions to the total area of sections obtained by cutting the honeycomb structure vertically to an axial direction.

In the present embodiment, when the value (L/T) of the ratio of the diagonal distance L between the intersections 3 to the average thickness T of the partition walls 1 is set to 1.6 or more and the average thickness T of the partition walls 1 is set to be comparatively small, a temperature rise performance is improved. To prevent drop of a thermal capacity, as described above, the value (L/T) of the ratio of the diagonal distance L between the intersections 3 to the average thickness T of the partition walls 1 is set to 1.6 or more. Moreover, the intersection 3 is formed into the right-angled shape or the curved shape to increase a volume of each intersection 3. In consequence, a volume increase effect is sufficient exhibited to thereby secure the thermal capacity.

Moreover, in the present embodiment, the open area ratio of the cells 2 is set to 55% or more to prevent output decrease of an engine due to increase of pressure losses.

In the present embodiment, the partition walls 1 constituting the honeycomb structure 10 are made of at least one ceramic selected from the group consisting of cordierite, alumina, mullite and lithium aluminosilicate (LAS). According to such a constitution, when the partition walls are made of cordierite or the like having a low thermal conductivity, during temperature rise, a temperature of the comparatively thin partition wall 1 first rises, and a catalyst with which the honeycomb structure is coated reaches an activation temperature. Subsequently, the intersection 3 having a large thermal capacity is heated. Therefore, as compared with a case where all of the partition walls 1 are thickened to increase the thermal capacity, a time required for reaching the catalyst activation temperature can be shortened. Conversely, during drop of an exhaust temperature, the temperature of the comparatively thin partition wall 1 first drops. However, since heat is stored in the intersection 3, the temperature drop can be prevented as compared with a structure in which the partition walls 1 usually have a small thickness. To promote reaction, it is effective to set a temperature distribution of the honeycomb structure to be as uniform as possible. However, the thermal capacity of the partition wall 1 is reduced, whereas the thermal capacity of the intersection 3 is conversely increased. In consequence, the whole temperature distribution viewed in a macro manner can be uniformed, and the reaction can be promoted.

According to the present invention, a honeycomb structure coated with a catalyst is provided which is constituted by coating any of the above honeycomb structures with the catalyst. Here, examples of the catalyst include an oxidation catalyst, an NOx occluding reduction catalyst and an SCR catalyst.

Moreover, according to the present invention, a purification device is provided in which any of the above honeycomb structures or the above honeycomb structure coated with the catalyst is installed at a previous stage of a filter.

EXAMPLES

The present invention will hereinafter be described more specifically in accordance with examples, but the present invention is not limited to these examples.

Example 1

Materials such as talc, kaolin, alumina and silica were mixed at a predetermined mixture ratio so that the materials formed cordierite after fired. A binder, a surfactant and water were added to the materials and mixed at a predetermined mixture ratio to obtain a clay. A particle size, components and the like of a cordierite forming material finally have an influence on porosity and coefficient of thermal expansion, but the material can appropriately be selected by any person skilled in the art. The binder and the surfactant can appropriately be selected. The resultant clay was extruded and formed using an extruder provided with a die having an adjusted slit width in consideration of shrinkages at drying and firing stages so as to obtain a fired cell structure shown in Table 1. The extruded clay was dried and fired to prepare a honeycomb structure having a diameter of 100 mm, a length of 100 mm and substantially square cells. It is to be noted that an R or C-dimension of the intersection shown in Table 1 is set by subjecting an intersection between slits of the die to R or C-processing. When this dimension is set, a diagonal distance between the intersections is also determined. An average thickness of partition walls is determined by adjusting the slit width of the die. An open area ratio is determined in accordance with the slit width of the die, a cell pitch and the R or C-dimension. It is to be noted that the dimension of the die is not reflected in the dimension of a cell structure of the honeycomb structure as it is. The cell structure dimension of the honeycomb structure is influenced by dimensional shrinkage of a drying/firing step.

The resultant honeycomb structure was installed, and an exhaust tube of a gasoline engine having an engine displacement of 2.0 L was subjected to canning. To obtain a repeated cycle of 200° C. and 400° C. in the engine, an engine load and the number of rotations were adjusted to measure an exhaust gas temperature immediately after a honeycomb. Assuming that Comparative Example 1 shown in Table 1 was a reference, a honeycomb structure having an average exhaust gas temperature rise of 10° C. or more was evaluated as ⊚, a honeycomb structure having an average exhaust gas temperature rise of 3° C. to 10° C. was evaluated as ○, and a honeycomb structure having an average exhaust gas temperature rise which was less than 3° C. was evaluated as X. As shown in Table 1, when a diagonal distance L between intersections 3 is set to be large, the rise of the average exhaust gas temperature can be confirmed. It has also been found that, when a value (L/T) of a ratio of the diagonal distance L between the intersections 3 to an average thickness T of partition walls 1 is set to 1.8 or more, a more effective result can be obtained. It is to be noted that the rise itself in the average exhaust gas temperature is about 10° C. at most, and this seems to be apparently a slight difference, but a time when the catalyst with which the honeycomb structure is coated holds a temperature not less than a catalyst activation temperature lengthens. Therefore, a very large effect of the temperature rise is obtained.

Examples 2 to 7, Comparative Examples 1 to 5

Honeycomb structures were obtained in the same manner as in Example 1 except that a cell structure of Example 1 was changed as shown in Table 1. Rises of average exhaust gas temperatures are shown in Table 1.

TABLE 1

| | Average thickness of partition walls (mm) | Diagonal distance between intersections (mm) | Shape of intersection | Open area ratio (%) | Ratio | No. of cells cpsi | Average exhaust gas temperature |
|---|---|---|---|---|---|---|---|
| Comparative Example 1 | 0.203 | 0.286 | — | 74.2 | 1.41 | 300 | Reference |
| Comparative Example 2 | 0.178 | 0.251 | — | 77.2 | 1.41 | 300 | X |
| Comparative Example 3 | 0.203 | 0.321 | R | 74.1 | 1.58 | 300 | X |
| Example 1 | 0.203 | 0.329 | R | 74.1 | 1.62 | 300 | ○ |
| Example 2 | 0.203 | 0.361 | R | 73.9 | 1.78 | 300 | ○ |
| Example 3 | 0.203 | 0.367 | R | 73.8 | 1.81 | 300 | ⊚ |
| Example 4 | 0.203 | 0.367 | C | 73.6 | 1.81 | 300 | ⊚ |
| Comparative Example 4 | 0.152 | 0.214 | — | 80.3 | 1.41 | 300 | X |
| Example 5 | 0.152 | 0.243 | R | 80.2 | 1.60 | 300 | ○ |
| Example 6 | 0.152 | 0.365 | R | 79.0 | 2.40 | 300 | ⊚ |
| Comparative Example 5 | 0.127 | 0.179 | — | 83.4 | 1.41 | 300 | X |
| Example 7 | 0.203 | 0.853 | R | 55.5 | 4.20 | 300 | ⊚ |

A honeycomb structure of the present invention is especially effective for purification of an exhaust gas discharged from a diesel engine having a comparatively low exhaust gas temperature, and can effectively be used as not only a honeycomb structure for a previous stage of a DPF but also a substrate for a selective catalytic reduction (SCR) catalyst for purifying NOx included in the exhaust gas and a diesel oxidation catalyst. The honeycomb structure is also effectively used in treating an exhaust gas discharged from a gasoline engine which discharges the exhaust gas at a comparatively high temperature.

What is claimed is:

1. A honeycomb structure comprising:
   a plurality of partition walls, and
   a plurality of cells arranged in parallel with one another to communicate between two end surfaces of the honeycomb structure being formed by the plurality of partition walls,
   wherein the plurality of partition walls are made of a ceramic;
   the cells have a substantially square shape;
   an intersection between the partition walls has a right-angled shape or a curved shape;
   a value of a ratio of a diagonal distance between the intersections to an average thickness of the partition walls (the diagonal distance between the intersections/the average thickness of the partition walls) is 1.6 or more; and
   an open area ratio of the cells is 55% or more.

2. The honeycomb structure according to claim 1, wherein the partition walls are made of at least one ceramic selected from the group consisting of cordierite, alumina, mullite and lithium aluminosilicate (LAS).

3. A honeycomb structure coated with a catalyst, constituted by coating the honeycomb structure according to claim 1 with the catalyst.

4. A purification device comprising:
   a filter, and
   the honeycomb structure according to claim 1 upstream of the filter.

5. A purification device comprising:
   a filter, and
   the honeycomb structure coated with the catalyst according to claim 3 upstream of the filter.

* * * * *